US011452979B2

(12) United States Patent
Kang et al.

(10) Patent No.: US 11,452,979 B2
(45) Date of Patent: Sep. 27, 2022

(54) METHOD FOR PRODUCING PLATE TYPE METAL-SILICA COMPOSITE AEROGEL AND PLATE TYPE METAL-SILICA COMPOSITE AEROGEL PRODUCED THEREBY

(71) Applicant: LG CHEM, LTD., Seoul (KR)

(72) Inventors: Tae Gyeong Kang, Daejeon (KR); Je Kyun Lee, Daejeon (KR); Jong Hun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 885 days.

(21) Appl. No.: 16/315,572

(22) PCT Filed: Oct. 10, 2017

(86) PCT No.: PCT/KR2017/011126
§ 371 (c)(1),
(2) Date: Jan. 4, 2019

(87) PCT Pub. No.: WO2018/169155
PCT Pub. Date: Sep. 20, 2018

(65) Prior Publication Data
US 2020/0179894 A1 Jun. 11, 2020

(30) Foreign Application Priority Data
Mar. 16, 2017 (KR) .................. 10-2017-0033376

(51) Int. Cl.
*B01J 13/00* (2006.01)
*C01B 33/158* (2006.01)
*C01B 33/159* (2006.01)

(52) U.S. Cl.
CPC ......... *B01J 13/0091* (2013.01); *C01B 33/159* (2013.01); *C01B 33/1585* (2013.01); *C01P 2002/50* (2013.01)

(58) Field of Classification Search
CPC ........ B01J 20/00; B01J 20/02; B01J 20/0203; B01J 20/027; B01J 20/103;
(Continued)

(56) References Cited

U.S. PATENT DOCUMENTS 3,434,912 A 3/1969 Peri
6,197,270 B1 3/2001 Sonoda et al.
(Continued)

FOREIGN PATENT DOCUMENTS

CN 103432968 A 12/2013
EP 0 849 220 A1 6/1998
(Continued)

OTHER PUBLICATIONS

KR-10-1127944-machine translation, 2012, Rang et al.*
(Continued)

*Primary Examiner* — Smita S Patel
(74) *Attorney, Agent, or Firm* — Morgan, Lewis & Bockius LLP

(57) ABSTRACT

A method for producing a plate type metal-silica composite aerogel and a plate type metal-silica composite aerogel produced thereby in which the metal salt concentration and the basic catalyst concentration are adjusted to form a plate type intermediate first, and then an appropriate amount of a water glass solution is added, thereby enabling the plate type metal-silica composite aerogel to be produced in a short time under conditions of low temperature and atmospheric pressure, so that the process is simpler than the conventional production method, and the cost is reduced, which is excellent in economy. Also provided is a plate type metal-silica composite aerogel, which is produced by the claimed method and has excellent dispersibility that requires no additional surface modifier.

14 Claims, 4 Drawing Sheets

(58) Field of Classification Search
CPC .. B01J 20/28047; B01J 13/0091; C01F 11/20; C01F 11/24; C01F 11/00; C01B 33/1585; C01B 33/00; C01B 33/159; C01B 33/32; C01B 33/38; C01B 33/14; C01P 2002/50; C08F 1/00

See application file for complete search history.

(56) References Cited

U.S. PATENT DOCUMENTS

| | | | |
|---|---|---|---|
| 7,892,643 | B2* | 2/2011 | Kutsovsky ............ B01J 20/103 423/337 |
| 2008/0034968 | A1 | 2/2008 | Nordberg et al. |
| 2011/0000370 | A1 | 1/2011 | Norberg et al. |
| 2018/0127277 | A1 | 5/2018 | Kim et al. |

FOREIGN PATENT DOCUMENTS

| | | |
|---|---|---|
| JP | H0264007 | 3/1990 |
| JP | 2002086509 | 3/2002 |
| KR | 10-0775602 | 11/2007 |
| KR | 10-1127944 | 3/2012 |
| KR | 10-1323303 | 10/2013 |
| KR | 10-2016-0141669 | 12/2016 |
| WO | 2016-195379 A1 | 12/2016 |

OTHER PUBLICATIONS

KR-10-0775602-machine translation, 2007 Keun et al.*
KR 10-2016-0141669-machine translation, 2016, Kim et al.*
Henrist et al., "Morphological study of magnesium hydroxide nanoparticles precipitated in dilute aqueous solution," Journal of Crystal Growth 249: 321-330 (2003).
Mohanan, J. L. and S. L. Brock, "Influence of Synthetic and Processing Parameters on the Surface Area, Speciation, and Particle Formation in Copper Oxide/Silica Aerogel Composites," Chem. Mater. 15(13): 2567-2576 (2003).
Office Action dated Oct. 29, 2021, issued in corresponding Chinese Patent Application No. 201780060233.

* cited by examiner

METHOD FOR PRODUCING PLATE TYPE METAL-SILICA COMPOSITE AEROGEL AND PLATE TYPE METAL-SILICA COMPOSITE AEROGEL PRODUCED THEREBY

CROSS-REFERENCE TO RELATED APPLICATIONS

This application is a National Stage Application of International Application No. PCT/KR2017/011126 filed on Oct. 10, 2017, which claims the benefit of Korean Patent Application No. 10-2017-0033376, filed on Mar. 16, 2017, the disclosure of which is incorporated herein in its entirety by reference.

TECHNICAL FIELD

The present invention relates to a method for producing a plate type metal-silica composite aerogel and a plate type metal-silica composite aerogel produced thereby.

BACKGROUND ART

An aerogel is a superporous, high specific surface area ($\geq 500$ m$^2$/g) material having a porosity of about 90 to 99.9% and a pore size in the range of 1 to 100 nm, and is a material excellent in ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively performed.

The biggest advantage of the aerogel is that the aerogel has a super-insulation exhibiting a thermal conductivity of 0.03 W/m·K or less, which is lower than that of an organic insulation material such as conventional Styrofoam, and that fire vulnerability and the occurrence of harmful gases in case of fire which are fatal weaknesses of the organic insulation material can be solved.

Aerogels excellent in thermal insulation performance as described above are attracting attention as a filler for polymers used as the use for thermal insulation such as refrigerator sheets, polyurethane, and EPS.

However, aerogels contain air in 90% or more of the inner pores structurally, so that the aerogels are too low in density to be impregnated into the resin due to severe scattering during processing with the resin, and even when some portions are impregnated, the difference in density is too large, thus not being capable of uniformly mixed with the resin. In addition, in order to efficiently block the heat transfer and to exhibit the thermal insulation effect due to filling, 50% or more by volume should be mixed. However, the aerogel powder is generally very weak in strength due to high porosity, so that processing the resin and the like at such a high mixing ratio may cause the mechanical properties of the plastic to deteriorate greatly, and thus is not possible.

In order to overcome such a problem due to the conventional aerogel powder, technologies in which the thermal insulation is effectively performed in the added resin and the appearance and the physical properties are not deteriorated are being developed. Accordingly, a metal-silica composite aerogel in which metal is introduced into an aerogel is being developed When various inorganic materials are used as fillers of various polymers such as polyethylene, polypropylene, or epoxy resin, it has been known that a plate type particle having a very high aspect ratio highly improves mechanical properties such as tensile strength, rigidity and the like compared to a spherical particle. The plate type particle also provides an incidental effect of shielding gas and moisture due to a thin layer structure.

However, such plate type particles have a low synthesis rate and are easily agglomerated due to stacking of particles, so that in order to be synthesized into a stable shape within a few hours, a separate high-temperature and high-pressure device such as an autoclave is essentially used. When being synthesized at an atmospheric pressure and a temperature of 100° C. or less, a long reaction time of 24 to 72 hours is required, and the addition of a surface modifier and the like is essentially required for dispersion.

In view of the above, the plate type particles are not widely used due to a low economical efficiency in spite of excellent effect.

Accordingly, the inventors of the present invention have developed a method for easily synthesizing a plate type metal-silica composite aerogel in a large capacity at a low temperature and atmospheric pressure.

PRIOR ART LITERATURE (Patent Document 1) Patent Application Publication No. 10-2010-0065692 (Jun. 17, 2010)

DISCLOSURE OF THE INVENTION

Technical Problem

An aspect of the present invention provides a method for producing a plate type metal-silica composite aerogel particle, wherein the method provides a plate type metal-silica aerogel particle capable of being produced in a short time at a low temperature and atmospheric pressure by forming a plate type intermediate and then adding an appropriate amount of a water glass solution.

Another aspect of the present invention provides a plate type metal-silica composite aerogel produced by the production method.

Technical Solution

According to an aspect of the present invention, there is provided a method for producing a plate type metal-silica aerogel particle including: 1) adding a basic catalyst to a reaction solution including metal salts to form a plate type intermediate; and 2) reacting a water glass solution added to a reaction solution in which the plate type intermediate is formed, wherein a molar concentration ratio of the reaction solution including metal salts to the water glass solution is 2:1 to 4:1.

In addition, an aspect ratio of the plate type metal-silica aerogel particle is 1:5 to 1:200, wherein the plate type metal-silica aerogel particle is provided such that a silica is contained in an amount of 20 to 30 wt %, based on the total weight of the plate type metal-silica aerogel particle.

Further, the present invention provides a filler for polymers including plate type metal-silica aerogel particles of the present invention.

Advantageous Effects

A method for producing a plate type metal-silica aerogel particle according to the present invention may produce a plate type metal-silica aerogel particle in a short time at a low temperature and atmospheric pressure, so that the production process is simpler than that of the conventional production method, the production cost is reduced, and thus there is an effect in that the economical efficiency is excellent.

Further, the plate type metal-silica aerogel particle produced by the above production method is excellent in dispersibility and does not require the addition of a surface modifier, so that there is an effect in that the production cost may be saved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter the present invention will be described in more detail to allow for a clearer understanding of the present invention. It will be understood that terms or words used in the present specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
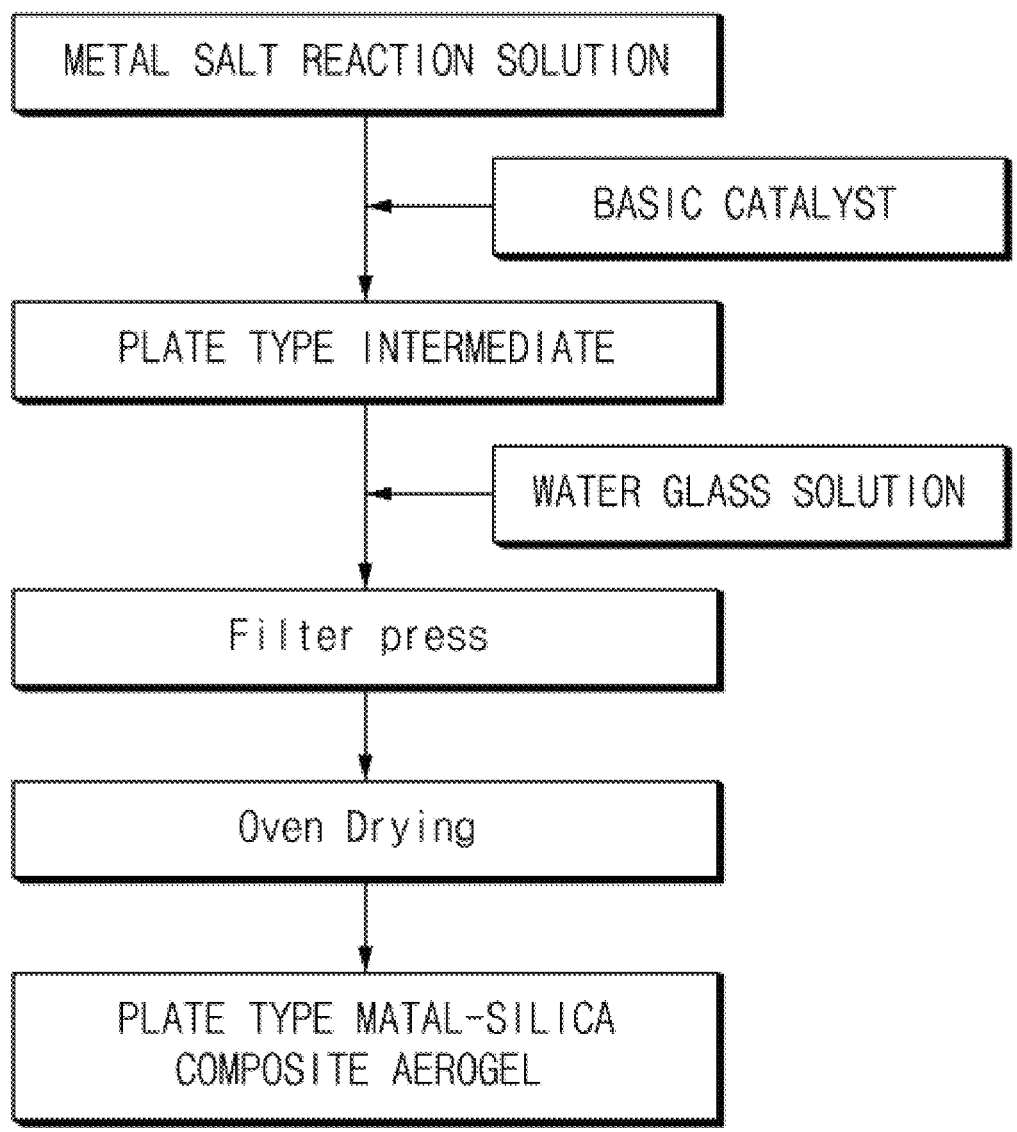
FIG. 1 is a flowchart schematically showing a method for producing a plate type metal-silica aerogel particle according to an embodiment of the present invention.

As shown in the flowchart of FIG. 1, a method for producing a plate type metal-silica aerogel particle according to an embodiment of the present invention includes: 1) adding a basic catalyst to a reaction solution including metal salts to form a plate type intermediate; and 2) reacting a water glass solution added to a reaction solution in which the plate type intermediate is formed, wherein a molar concentration ratio of the reaction solution including a metal salt to the water glass solution is 2:1 to 4:1.

Hereinafter the method for a plate type metal-silica aerogel particle of the present invention will be described in detail in each step.

Step 1)

Step 1) according to an embodiment of the present invention is a step of producing a plate type intermediate, wherein the plate type intermediate is produced by adding a basic catalyst to a reaction solution including a metal salt.

The formation of the plate type intermediate is an essential step of easily forming a structural shape of the plate type metal-silica aerogel particle, wherein the plate type intermediate of the present invention may be a hydroxide of the metal used in step 1).

The 'plate type' according to the present invention indicates a shape having an aspect ratio of 1:5 to 1:200. When metal-silica aerogel particles are used as fillers of various polymers, the particle having a plate type shape may greatly improve mechanical strength such as tensile strength, rigidity and the like compared to the particle having a spherical shape, and has an incidental effect in which due to a thin film structure, gas and moisture may be shielded more easily than the spherical particle.

However, the plate type particle has a low synthesis rate and a property in which agglomeration easily occurs due to stacking of particles. Thus, it is essential to use a separate high-temperature and high-pressure device such as an autoclave in order to synthesize the plate type particle in a stable shape within a few hours. In the case of synthesizing the plate type particle under an atmospheric pressure condition at a temperature of 100° C. or less, a long reaction time of 24 to 72 hours is required, and the addition of a surface modifier is essentially required for dispersion.

In view of the above, in order to solve the problem that plate type particles are not widely used due to low economical efficiency in spite of the excellent effect, the present invention provides a method for producing a plate type metal-silica composite aerogel, in which a metal salt concentration and a basic catalyst concentration are adjusted to form a plate type intermediate first and then an appropriate amount of a water glass solution is added, thereby enabling plate type metal-silica composite aerogel particles to be produced in a short time under low temperature and atmospheric pressure conditions, so that the method has a simpler process than the conventional production method and saves a production cost, thus being excellent in economical efficiency.

In an embodiment of the present invention, in order to more easily form a plate type structural shape of the plate type metal-silica aerogel particle of the present invention, a molar concentration ratio of the reaction solution containing a metal salt to the basic catalyst is preferably 1:1.5 to 1:3.

When the molar concentration of the metal salt in the reaction solution containing a metal salt is excessively high to such a degree to exceed the above ratio, an unreacted metal salt may react with the subsequently added water glass solution to form spherical metal-silica aerogels. On the contrary, when the molar concentration of the basic catalyst is too high, the pH of the reaction solution is raised to 12 or more, so that the stability of the formed particles may decrease and thus the particles may be agglomerated.

According to an embodiment of the present invention, the reaction solution containing the metal salt contains a metal salt and a reaction solvent, wherein the metal may be at least one selected from the group consisting of magnesium (Mg), calcium (Ca), aluminum (Al) and copper (Cu). In the present invention, more specifically, magnesium may be used.

Further, the metal salt may be at least one metal salt selected from the group consisting of chloride, nitrate and sulfate which are formed by using the metals. In the present invention, more specifically, magnesium chloride ($MgCl_2$) may be used.

In addition, the reaction solvent may be distilled with water or a polar solvent such as ethanol.

The basic catalyst reacts with the reaction solvent containing a metal salt to form a plate type intermediate, so that the pH of the subsequently added water glass solution may be increased, thus serving to promote the gelation reaction.

In an embodiment of the present invention, the basic catalyst may be preferable to use a weak base such as ammonium hydroxide ($NH_4OH$) having a relatively low base dissociation constant (K).

When a strong base such as sodium hydroxide (NaOH) is used, the pH is very high at 13 or higher during the reaction and exceeds the pH 12, which is known as the isoelectric point of magnesium hydroxide. Therefore, the electric charge on the surface of the formed particles becomes very low and the repulsive force between particles is reduced, so that the synthesized particles are not grown into plate type shapes but are agglomerated to each other to form spherical large particles. Therefore, the present invention may form plate type particles more easily by using a weak base.

The basic catalyst may be added dropwise such that the pH of the reaction solution becomes 9 to 11. When the pH of the reaction solution is out of the above range, gelation is not easy, or the gelation rate may be excessively slow to deteriorate the processability. In addition, the base may be precipitated when added as a solid form, thus being preferable to be added in the form of a solution diluted by alcohol (polar organic solvent).

Step 2)

Step 2) according to an embodiment of the present invention is a step of preparing a plate type metal-silica wet gel particle, wherein the step is performed by adding a silica precursor to the reaction solution including the plate type intermediate prepared by step 1).

In an embodiment of the present invention, the silica precursor may be a silicon-containing alkoxide-based compound such as tetramethyl orthosilicate (TMOS), tetraethyl orthosilicate (TEOS) or methyl triethyl orthosilicate, but in the present invention, more specifically, may be water glass.

The water glass of the present invention indicates a diluted solution obtained by adding distilled water to water glass and mixing, for example, a sodium silicate ($Na_2SiO_3$) aqueous solution, which is an alkali silicate salt obtained by melting silicon dioxide ($SiO_2$) and alkali. In the present invention, the water glass is uniformly coated on the surface of the plate type intermediate to serve as a dispersant, thus preventing particles from being agglomerated due to stacking, and serving so as to maintain a plate type structural shape.

Since the concentration of the water glass solution influences the aerogel formation and the physical properties of the plate type metal-silica aerogel particle produced by the production method of the present invention, the water glass solution may be diluted with deionized water to have a suitably adjusted concentration for use in the present invention.

In the present invention, the water glass solution may contain a silica ($SiO_2$) in a concentration of 0.5 to 1.0 M. When the concentration is less than 0.5 M, an aerogel structure may not be formed properly, and even when the aerogel is formed, the structure may not withstand the shrinkage phenomenon occurring during drying and thus may be collapsed to remarkably deteriorate physical properties. In addition, when the concentration exceeds 1.0 M, the density of the aerogel structure may be excessively high to withstand the shrinkage phenomenon occurring during drying, so that the problem caused due to the structure collapse may be alleviated, but the characteristics of a specific surface area may be deteriorated.

According to an embodiment of the present invention, when the water glass solution having the above concentration is used, the plate type metal-silica aerogel particles produced by the production method of the present invention may contain a silica in an amount of 20 to 30 wt %, based on the total weight of the plate type metal-silica aerogel particle.

When the silica is contained at an appropriate level as described above, an appropriate amount of the silica bonds to the surface of plate type particles, so that there may be an advantageous effect in which the agglomeration of particles is prevented to increase the dispersibility.

In addition, in order to produce the plate type metal-silica aerogel particle enabling the present invention to solve the targeted problem, the molar concentrations of the reaction solution containing a metal salt and the water glass solution should be adjusted appropriately, and in the present invention, the molar concentration ratio of the reaction solution containing a metal salt to the water glass solution is preferably 2:1 to 4:1.

When the concentration of the metal salt is too high beyond the above numeral range, the dispersibility of the aerogel particles is low, so that the particles are agglomerated very severely. Accordingly, it may be required to additionally add a surface modifier for dispersion.

In an embodiment of the present invention, a plate type metal-silica wet gel particle of the present invention may be formed by such a way in which the water glass solution is added dropwise to the reaction solution in which the plate type intermediate is formed, and thus the gelation reaction of the water glass solution is promoted due to the pH of the reaction solution.

That is, the plate type metal-silica wet gel particle of the present invention may be formed by the water glass solution reacting with OH groups present on the surface of the plate type intermediate to uniformly bond silica to the surface of the plate type intermediate, and the bonding may be formed by the sol-gel reaction.

Meanwhile, the gelation may allow for formation of a network structure from a silica precursor material, and the network structure may indicate a planar net-shaped structure in which specific polygons having one kind or more of atom arrays are connected to each other or a structure in which a three dimensional skeleton structure is formed by sharing vertices, edges, faces and the like.

In addition, the present invention is to enhance the structure of aerogels. After the gelation reaction is completed, an aging step is additionally performed such that the resultant obtained from the gelation reaction is left at an appropriate temperature to be completely chemically changed, thereby enabling the formed network structure to be formed more firmly, so that the mechanical stability of the plate type metal-silica aerogel particles of the present invention may be further enhanced.

According to an embodiment of the present invention, the production method of the present invention may further include, after step 2), steps of performing washing and drying.

The washing of the present invention is a step of producing a plate type metal-silica aerogel particle having a high purity by removing impurities generated during the reaction. The washing may be performed by adding a washing solvent to the plate type metal-silica wet gel and diluting and stirring the plate type metal-silica wet gel mixture for 20 minutes to 1 hour, and distilled water or alcohol may be used as the washing solvent.

The drying is a step of removing a solvent from the metal-silica composite wet gel to form a metal-silica composite aerogel, and may be performed by drying the metal-silica composite wet gel at atmospheric pressure for 1 to 4 hours under a temperature condition of 100 to 190° C.

When plate type metal-silica aerogel particles are produced by using the production method of the present invention as described above, unlike the conventional production method, the plate type metal-silica aerogel particles may be produced within a short time under conditions of low temperature and atmospheric pressure.

Therefore, the production method of the present invention is characterized in that the plate type metal-silica aerogel particles are synthesized within a short time of 3 to 6 hours at a reaction temperature of 25 to 50° C., more specifically 25 to 40° C. and a pressure of atmospheric pressure, more specifically 1 to 1.2 bar.

Meanwhile, 'atmospheric pressure' or normal pressure indicates a pressure which is not particularly reduced or increased without using a separate high-pressure device such as an autoclave.

When the molar concentrations of the reaction solution containing a metal salt and the basic catalyst as in the production method of the present invention are adjusted at an appropriate ratio, the synthesis rate of the plate type intermediate increases; thereafter, when the molar concentrations of the reaction solution containing a metal salt and the silica are adjusted at an appropriate ratio, the silica may be uniformly formed on a surface of the plate type intermediate, so that the occurrence of agglomeration due to stacking may be more easily suppressed.

Therefore, according to the production method of the present invention, a separate high-temperature and high-pressure device such as an autoclave may not be required to save the production cost, the simple and safer process allows for excellent productivity and economical efficiency, and the uniformly coated silica allows for an increase in dispersibility, so that a separate surface modifier is not also required, and there is an effect that the production cost may be saved.

When the reaction temperature in the production method of the present invention is less than 25° C., a plate type structure is not properly synthesized or the synthesis rate is too slow, so that the reaction time may be longer than the time required by the present invention; when the reaction time exceeds 50° C., the synthesis rate may be accelerated, but the particles have a tendency to be easily agglomerated with each other at a high temperature, thus causing the stacking occurrence problem.

Further, when the reaction pressure is lower than the atmospheric pressure, the plate type structure is not properly synthesized or the synthesis rate is too slow, so that there may be a problem that the reaction time is longer than the time required by the present invention. When the reaction is carried out at a high pressure, a high-pressure and high-priced device is required, which may complicate the process, thereby resulting in an increase in production cost, a decrease in production efficiency, and a problem in stability due to use of high-pressure dangerous equipment.

As described above, in a method for producing a plate type metal-silica composite aerogel of the present invention, the metal salt concentration and the basic catalyst concentration are adjusted to form a plate type intermediate first, and then an appropriate water glass solution is added, so that a plate type metal-silica composite aerogel may be produced in a short time under conditions of low temperature and atmospheric pressure. Therefore, the process is simpler than that of the conventional production method, and the production cost may be saved to improve productivity and economical efficiency.

Further, the present invention provides plate type metal-silica aerogel particles, which are produced by the production method of the present invention, have an aspect ratio of 1:5 to 1:200, and contain silica in an amount of 20 to 30 wt % based on the total weight of the plate type metal-silica aerogel particle. Also, the present invention provides a filler for polymers containing plate type metal-silica aerogel particles of the present invention.

The plate type metal-silica aerogel particles of the present invention improve dispersibility, so that processability, flame retardancy, thermal insulation, gas and moisture shielding and the like may be improved when the plate type metal-silica aerogel particles are used as a filler for polymers.

Hereinafter, examples of the present invention will be described in detail so that those skilled in the art can easily carry out the present invention. The present invention may, however, be embodied in many different forms and should not be construed as limited to the embodiments set forth herein.

Example 1

A 4.0 M (molar concentration) aqueous ammonia solution was slowly added dropwise to an aqueous solution including 2.0 M $MgCl_2$, and then the resulting mixture was reacted while being stirred for 2 hours. Then, a 0.5 M water glass solution was slowly added dropwise to the resultant, and then the resulting mixture was stirred for 2 hours for a gelation reaction to form plate type metal-silica wet gel particles.

Thereafter, the resultant was washed twice with a filter press and then dried in an oven of 150° C. to finally produce plate type metal-silica aerogel particles.

The reaction was carried out at a temperature of 25° C. and a pressure of 1 bar, and the total process time was 6 hours.

Example 2 and Comparative Examples 1 to 3

Metal-silica aerogel particles were produced by using the same manner as in Example 1, except that the metal salt concentration, the basic catalyst concentration, and the water glass solution concentration were used as described in Table 1 below.

TABLE 1

| Classification | Metal salt ($MgCl_2$) concentration (M) | Basic catalyst concentration (M) | Water glass solution concentration (M) |
| --- | --- | --- | --- |
| Example 1 | 2.0 | 4.0 ($NH_4OH$) | 0.5 |
| Example 2 | 4.0 | 8.0 ($NH_4OH$) | 1.0 |
| Comparative Example 1 | 2.0 | 4.0 ($NH_4OH$) | 0 |
| Comparative Example 2 | 2.0 | 4.0 ($NH_4OH$) | 2.0 |
| Comparative Example 3 | 2.0 | 4.0 (NaOH) | 0.5 |

Experimental Example 1: Electron Microscope (SEM) Photographing

Scanning electron microscope (SEM) photographs of the plate type metal-silica aerogel particles in Examples 1 and 2 and Comparative Examples 1 to 3 were taken (FIGS. 2 to 6).

Figure 2:
FIG. 2 is a SEM photograph (scale bar—1.0 μm) of plate type metal-silica aerogel particles produced by Example 1 of the present invention.
Figure 3:
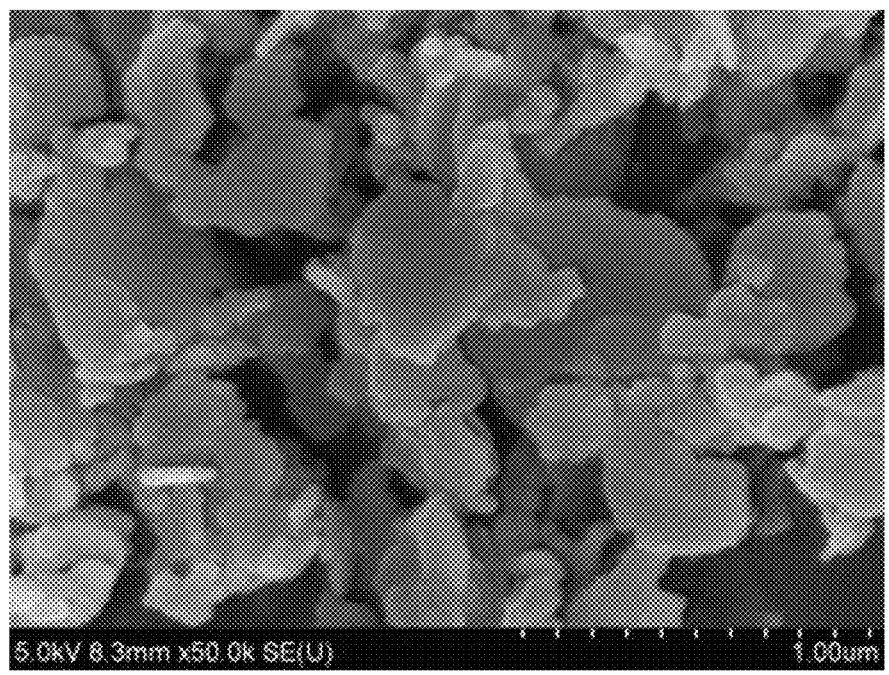
FIG. 3 is a SEM photograph (scale bar—1.0 μm) of plate type metal-silica aerogel particles produced by Example 2 of the present invention.
Figure 4:
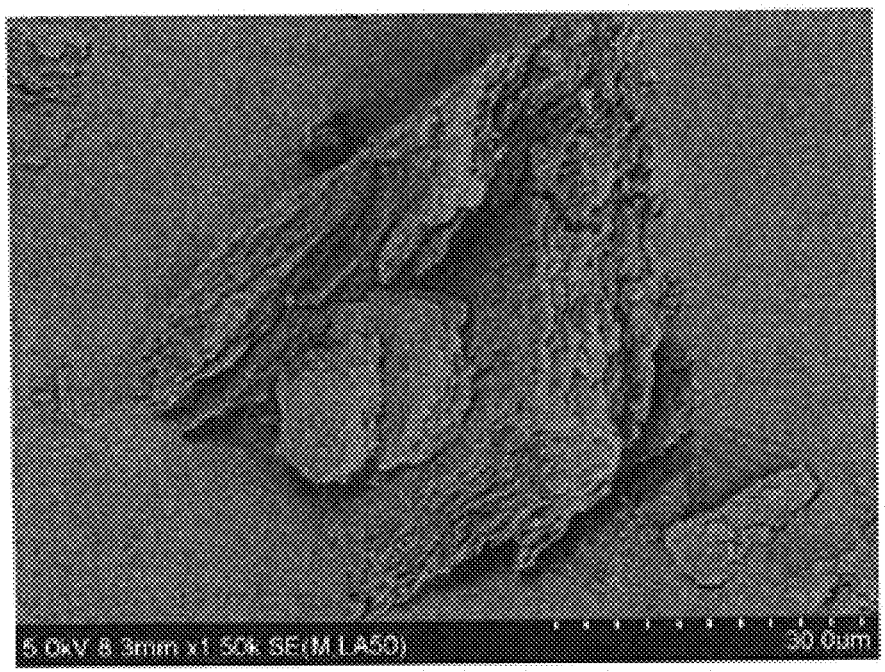
FIG. 4 is a SEM photograph (scale bar—30 μm) of plate type metal-silica aerogel particles produced by Comparative Example 1 of the present invention.
Figure 5:
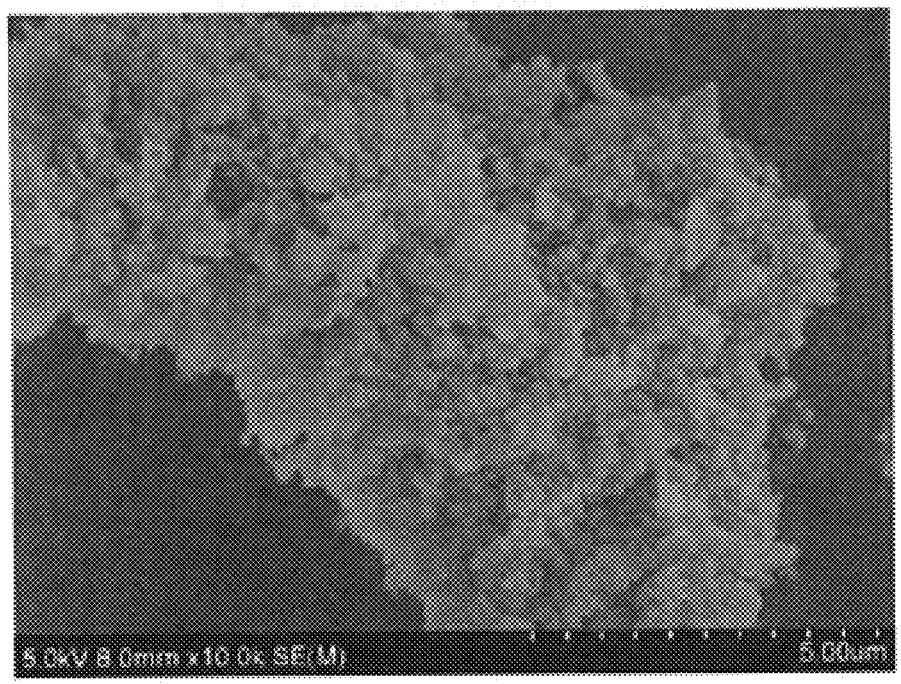
FIG. 5 is a SEM photograph (scale bar—5 μm) of plate type metal-silica aerogel particles produced by Comparative Example 2 of the present invention.
Figure 6:
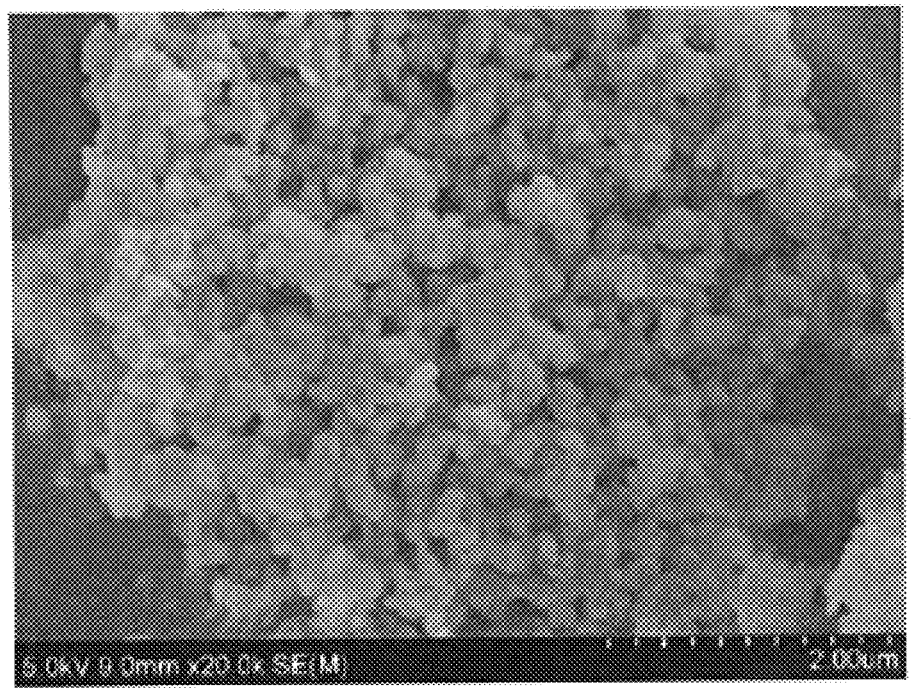
FIG. 6 is a SEM photograph (scale bar—2 μm) of plate type metal-silica aerogel particles produced by Comparative Example 3 of the present invention.

As shown in FIG. 2 and FIG. 3, it could be observed that the plate type metal-silica aerogel particles produced by the production method of Examples 1 and 2 of the present invention were uniformly dispersed by synthesizing the plate type particles.

On the contrary, in Comparative Example 1 (FIG. 4) in which no water glass was added, it was found that the particles were very severely stacked and poor in dispersibility. In Comparative Example 2 (FIG. 5) in which the water glass was used in an excessive amount and Comparative Example 3 (FIG. 6) in which a strong base of sodium hydroxide rather than a weak base was used, it was found that many spherical particles rather than plate type particles were observed, and each of the particles was severely agglomerated.

Thus, according to the production method of the present invention, it may be seen that the metal-silica composite aerogel has the greatly improved mechanical strength due to the plate type structure, has excellent dispersibility, and thus may improve processability, flame retardancy, thermal insulation, gas and moisture shielding and the like when used as a filler for polymers.

The foregoing description of the present invention has been presented for purposes of illustration. It will be understood by those skilled in the art that various changes in form and details may be made therein without departing from the spirit and scope of the invention as defined by the appended claims. It is therefore to be understood that the above-described embodiments are illustrative in all aspects and not restrictive.

The invention claimed is:

1. A method for producing a plate shape metal-silica aerogel particle, the method comprising:
   1) adding a basic catalyst to a reaction solution containing a metal salt to form a plate shape intermediate; and
   2) adding a water glass solution to the reaction solution containing the metal salt in which the plate shape intermediate is formed, wherein:
   a molar concentration ratio of the reaction solution containing the metal salt to the basic catalyst is 1:1.5 to 1:3,
   a molar concentration ratio of the reaction solution containing the metal salt to the water glass solution is 2:1 to 4:1,
   the plate shape metal-silica aerogel particle has an aspect ratio of 1:5 to 1:200, and
   the water glass solution contains a silica ($SiO_2$).

2. The method of claim 1, wherein the plate shape metal-silica aerogel particle is formed by bonding the silica to a surface of the plate shape intermediate.

3. The method of claim 2, wherein the bonding is formed by gelation.

4. The method of claim 2, wherein the silica is present in an amount of 20 to 30 wt %, based on a total weight of the plate shape metal-silica aerogel particle.

5. The method of claim 1, wherein the step 2) is performed at a reaction temperature of 25 to 50° C.

6. The method of claim 1, wherein the step 2) is performed at a pressure of 1 to 1.2 bar.

7. The method of claim 1, wherein the step 2) is performed for 3 to 6 hours.

8. The method of claim 1, wherein the silica ($SiO_2$) is present in a concentration of 0.5 to 1.0 M.

9. The method of claim 1, wherein the metal salt comprises at least one metal selected from the group consisting of magnesium (Mg), calcium (Ca), aluminum (Al), and copper (Cu).

10. The method of claim 1, wherein the metal salt is at least one selected from the group consisting of a chloride, a nitrate, and a sulfate.

11. The method of claim 1, wherein the basic catalyst is ammonium hydroxide ($NH_4OH$).

12. The method of claim 1, further comprising, after the step 2), performing washing and drying.

13. The method of claim 1, wherein the method excludes adding an additional surface modifier.

14. The method of claim 1, wherein the plate shape metal-silica aerogel particle is formed by the water glass solution reacting with OH groups present on a surface of the plate shape intermediate to bond the silica to the surface of the plate shape intermediate.

* * * * *